United States Patent
Sorin (10) Patent No.: US 9,332,514 B2
(45) Date of Patent: May 3, 2016

(54) METHOD AND SYSTEM FOR INITIAL SIGNAL ACQUISITION IN MULTIPATH FADING CHANNEL CONDITIONS

(71) Applicant: QUALCOMM INCORPORATED, San Diego, CA (US)

(72) Inventor: Simha Sorin, Zoran (IL)

(73) Assignee: QUALCOMM INCORPORATED, San Diego, CA (US)

( * ) Notice: Subject to any disclaimer, the term of this patent is extended or adjusted under 35 U.S.C. 154(b) by 129 days.

(21) Appl. No.: 14/159,102

(22) Filed: Jan. 20, 2014

(65) Prior Publication Data

US 2014/0204928 A1    Jul. 24, 2014

Related U.S. Application Data

(60) Provisional application No. 61/754,821, filed on Jan. 21, 2013, provisional application No. 61/755,764, filed on Jan. 23, 2013.

(51) Int. Cl.
*H04W 56/00* (2009.01)
*H04L 7/10* (2006.01)
(Continued)

(52) U.S. Cl.
CPC ............... *H04W 56/001* (2013.01); *H04L 7/10* (2013.01); *H04B 1/7073* (2013.01); *H04L 7/041* (2013.01)

(58) Field of Classification Search
CPC .... H04W 56/001; H04W 16/28; H04L 69/22; H04L 27/00; H04L 5/0048; H04L 25/00; H04L 7/004; H04L 7/041; H04L 7/10; H04B 1/7073; H04B 1/7156; H04B 7/2681

USPC .......................................................... 370/338
See application file for complete search history.

(56) References Cited

U.S. PATENT DOCUMENTS

| 2006/0093078 A1* | 5/2006 | Lewis ........................ H04L 7/08 375/343 |
| 2009/0125792 A1* | 5/2009 | Lakkis ........................... 714/783 |
| 2009/0163143 A1* | 6/2009 | De Rore ....................... 455/63.1 |

(Continued)

OTHER PUBLICATIONS

IEEE Computer Society, "IEEE Std 802.11 ad™-2012: Part 11: Wireless LAN Medium Access Control (MAC) and Physical Layer (PHY) Specifications; Amendment 3: Enhancements for Very High Throughput in the 60 GHz Band"; Dec. 28, 2012; IEEE Standards Association, New York, NY; pp. 448-449, 455.

*Primary Examiner* — Un C Cho
*Assistant Examiner* — Shah Rahman (57) ABSTRACT

An apparatus and method for performing initial signal acquisition in a receiver of a millimeter wave wireless communication system. The apparatus comprises receiving a millimeter-wave signal including complementary sequences at the receiver; cross-correlating the received signal related to the received complementary sequences with respective predefined complementary sequences, wherein the received complementary sequences include a first type of complementary sequences and a second type of complementary sequences; performing a signal sequence detection by auto-correlating the cross-correlated first type of complementary sequences and comparing the auto-correlated results to an energy dependent threshold; and upon detection of the signal sequence, performing a timing synchronization to synchronize a start frame delimiter (SFD), wherein the timing synchronization includes in part a search for a peak in the cross-correlated first type of complementary sequences using a SFD search threshold.

16 Claims, 6 Drawing Sheets

(51) Int. Cl.
*H04L 7/04* (2006.01)
*H04B 1/7073* (2011.01)

(56) References Cited

U.S. PATENT DOCUMENTS

| | | | |
|---|---|---|---|
| 2009/0175261 A1* | 7/2009 | Oh | H04L 1/0079 370/350 |
| 2009/0285240 A1* | 11/2009 | Zhang | H04J 13/0014 370/476 |
| 2010/0080266 A1* | 4/2010 | Zhang et al. | 375/140 |
| 2010/0111229 A1* | 5/2010 | Kasher et al. | 375/308 |
| 2011/0110457 A1* | 5/2011 | Lakkis | 375/295 |
| 2011/0110470 A1* | 5/2011 | Yu | H04L 27/2656 375/343 |
| 2011/0116534 A1* | 5/2011 | Seibert | H04L 7/042 375/224 |
| 2012/0207192 A1* | 8/2012 | Zhang et al. | 375/135 |

* cited by examiner

METHOD AND SYSTEM FOR INITIAL SIGNAL ACQUISITION IN MULTIPATH FADING CHANNEL CONDITIONS

CROSS REFERENCE TO RELATED APPLICATION

This application claims the benefit of U.S. Provisional Application No. 61/754,821, filed Jan. 21, 2013 and U.S. Provisional Application No. 61/755,764, filed Jan. 23, 2013, the contents of which are incorporated herein by reference.

TECHNICAL FIELD

The invention generally relates to techniques for frame synchronization in a wireless communication system, and more particularly to techniques for channel sequence detection using cross-correlation and auto-correlation synchronization.

BACKGROUND

The 60 GHz band is an unlicensed band which features a large amount of bandwidth and a large worldwide overlap. The large bandwidth means that a very high volume of information can be transmitted wirelessly. As a result, multiple applications that require transmission of a large amount of data can be developed to allow wireless communication around the 60 GHz band. Examples of such applications include, but are not limited to, wireless high definition TV (HDTV), wireless docking stations, wireless Gigabit Ethernet, and many others. Wireless local area network (WLAN) standards, such as WiGig Alliance (WGA) and IEEE 802.11ad, are being developed to serve applications that utilize the 60 GHz spectrum.

Such communication standards enable wireless transmission between two stations that are a short distance from each other. Typically, in such wireless transmission systems, signals circulate between transmitters and receivers by way of channels. Due to many factors in a channel's characteristics, an unwanted distortion may be induced in the signal transmitted by the transmitter. Accordingly, it is generally necessary to determine the characteristics of a channel at a given moment in order to estimate the induced distortion in the transmitted signal.

Signal acquisition is required to enable proper operation of the wireless system. Preferably, signal acquisition should be performed in any type of channel condition as defined by for the operation of wireless transmission system. In particular, in a millimeter-wave wireless transmission system operating in the 60 GHz band, for example, as defined by the IEEE 802.11ad standard published Dec. 28, 2012 (hereinafter the IEEE 802.11ad standard), an initial signal acquisition includes periodically identifying detection sequences in the received signal and then trying to synchronize the sequences to a starting time of frames carrying the transmitted data.

Typically, a transmitted frame includes a preamble portion and a payload portion. The preamble is used for signal and packet detection, AGC setting, frequency offset estimation, timing synchronization, indication of antenna diversity selection and modulation (OFDM or SC), and channel estimation. The format of the preamble is common to both OFDM packets and SC packets.

Figure 1:
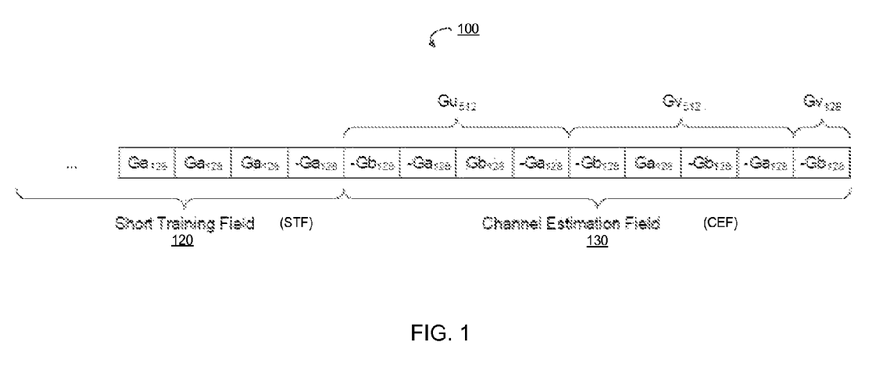
FIG. 1 is an illustration of an IEEE 802.11ad preamble.

As shown in FIG. 1, an IEEE 802.11ad preamble 100 of a PLOP protocol data unit (PPDU) packet is composed of two parts, a short training field (STF) 120 and a channel estimation field (CEF) 130. Both the STF 120 and CEF 130 fields contain Golay complementary sequences, which are transmitted by a transmitter and are correlated by a receiver in a millimeter-wave wireless transmission system. Typical Golay complementary sequences have many advantageous properties, such as producing a perfect sum of correlations and providing efficient implementations requiring only $\log_2(N)$ additions for two complementary sequences of length N.

The STF 120 is composed of 16 repetitions of the sequence $Ga_{128}(n)$ in length 128 followed by a single repetition of $-Ga_{128}(n)$. The CEF 130 is used for channel estimation, as well as for indicating which modulation is going to be used for the packet. The CEF 130 is composed of a concatenation of two sequences, $Gu_{512}(n)$ and $Gv_{512}(n)$, where the last 128 samples of both $Gu_{512}(n)$ and $Gv_{512}(n)$ are equal to the last 128 samples used in the short training field (e.g., $-Ga128(n)$). These sequences are followed by a 128 sample sequence, $Gv_{128}(n)$, equal to the first 128 samples of both $Gu_{512}(n)$ and $Gv_{512}(n)$.

There are a number of techniques for initial signal acquisition in millimeter-wave wireless transmission systems. Typically, an initial signal acquisition requires detection and timing synchronization. One such technique for initial signal acquisition is based on an energy detector which is relatively simple to design. The signal is detected by comparing the output of the energy detector with a threshold defined by the noise energy. The noise level can only be estimated with limited accuracy due, for example, to the fact that the antenna noise varies as a function of indoor and/or outdoor conditions.

The noise induced by the communication channel and/or wireless system may vary over frequency and during operations, and as such the noise level estimation itself always has some error. Therefore, a detection threshold level determined in part by the estimated noise has no means to differentiate between the actual signal and induced noise as well as to distinguish between signals transmitted by transmitters in the vicinity of the receiver.

Another technique for signal acquisition and particularly for signal detection, as defined in the IEEE 802.11ad standard, is based on an auto-correlation of the received signal within a periodic detection sequence length. The main advantage of this technique is immunity to multipath channels and frequency offset below an ambiguity limit. This technique also allows the auto-correlation to be averaged in order to improve SNR sensitivity performance of the detection flow. However, auto-correlation of the received raw signals, i.e., signals without any data-processing, may cause false alarm detections in the presence of any periodic interfering signals (e.g.—DC or LO leakage).

Another technique for signal detection is based on, in part, cross-correlation. The cross-correlation of the received signal is typically performed with an IEEE 802.11ad pre-defined detection-sequence pattern. The main advantage of this technique is that the technique is robust against gain variations and other analog imperfections, hence its improved performance for lower SNRs relative to other techniques.

An initial signal acquisition process further requires a signal timing synchronization to detect a starting of the frame. In the IEEE 802.1 lad standard, for example, the signal timing synchronization is detected using cross-correlation of a start frame delimiter (SFD). As noted above, the IEEE 802.11ad preambles contain several repetitions of Golay-128 pattern, followed by the SFD-Channel-Estimation Golay-512-patterns.

The disadvantage of the correction techniques is that a threshold for comparison of the correlation results is either constant, or relative to the energy level of the received signals.

Typically, the detection-threshold causes an un-trustable detection performance in low SNR ranges in the presence of a multipath channel.

It would be therefore advantageous to provide a solution that would overcome the disadvantages of existing techniques for signal acquisition in millimeter-wave wireless systems.

SUMMARY

Certain embodiments disclosed herein include a method for performing initial signal acquisition in a receiver of a millimeter wave wireless communication system. The method comprises receiving a millimeter-wave signal including complementary sequences at the receiver; cross-correlating the received signal related to the received complementary sequences with respective predefined complementary sequences, wherein the received complementary sequences include a first type of complementary sequences and a second type of complementary sequences; performing a signal sequence detection by auto-correlating the cross-correlated first type of complementary sequences and comparing the auto-correlated results to an energy dependent threshold; and, upon detection of the signal sequence, performing a timing synchronization to synchronize a start frame delimiter (SFD), wherein the timing synchronization includes in part a search for a peak in the cross-correlated first type of complementary sequences using a SFD search threshold.

Certain embodiments disclosed herein also include an apparatus for performing initial signal acquisition in a receiver of a millimeter wave wireless communication system. The apparatus comprises a radio frequency (RF) circuitry receiving a millimeter-wave signal including complementary sequences at the receiver; a cross-correlator for cross-correlating the received signal related to the received complementary sequences with respective predefined complementary sequences, wherein the received complementary sequences include a first type of complementary sequences and a second type of complementary sequences; a signal sequence detection module for detecting a signal sequence in the received signal, wherein the signal sequence detection module is configured to auto-correlate the cross-correlated first type of complementary sequences and compare the auto-correlated results to an energy dependent threshold; and a timing synchronization module for performing a timing synchronization to synchronize on a start frame delimiter (SFD), wherein the timing synchronization module is configured to search for a peak in the cross-correlated first type of complementary sequences using a SFD search threshold.

BRIEF DESCRIPTION OF THE DRAWINGS

The subject matter disclosed herein is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

According to the disclosed embodiments an apparatus and method for initial signal acquisition in multipath fading channel conditions are provided. The method and apparatus are implemented in a millimeter-wave wireless receiver operable to receive wireless signals in 60 GHz frequency band. The fading may either be due to multipath induced fading and/or shadowing from obstacles affecting the wave propagation, and other indoor/outdoor conditions. The fading may be also caused due to the architecture of the wireless receiver. The embodiments disclosed herein would also enable signal acquisition when an unwanted distortion or noise is induced in signals transmitted by a transmitter of the millimeter-wave wireless system.

Figure 2:
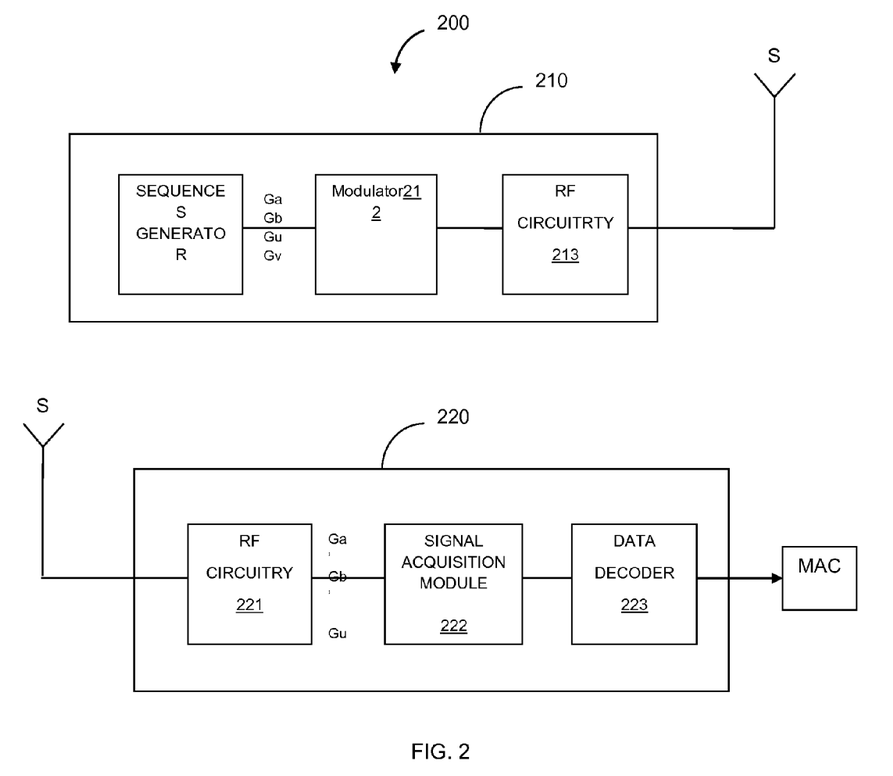
FIG. 2 is a block diagram of a millimeter-wave wireless communication system.

FIG. 2 shows an exemplary and non-limiting block diagram of a millimeter-wave wireless communication system 200 utilized to disclose the various embodiments. The system 200 includes a transmitter 210 and a receiver 220. In the transmitter 210, a complementary sequences generator 211 generates complementary sequences, such as Golay complementary sequences (Ga, Gb, Gu, Gv). The generated sequences are modulated and transmitted using a modulator 212 and an RF circuitry 213 as a millimeter-wave signal S. The signal S may be transmitted over the 60 GHz frequency band. The modulator 212 may be, for example, an OFDM modulator, an SC (Single Carrier) modulator, and the like.

The signal S' including the complementary sequences is received at the receiver 220. It should be noted that due to the channel conditions, the received signal S' and its complementary sequences (Ga', Gb', Gu', Gv') may be different from the original sequences Ga, Gb, Gu, Gv. After the signal S' is received and fed into RF circuitry 221, the received sequences Ga', Gb', Gu', Gv' are fed into a signal acquisition module 222. The module 222 is configured to perform signal detection and signal timing synchronization based on the embodiments disclosed in greater detail below.

In particular, the signal acquisition module 222 is configured to set signals on reliable and relative thresholds in noisy channel conditions. Therefore, a reliable and robust signal acquisition is guaranteed even in noisy channel conditions. A data-decoder 223 is also included in the receiver 220 for decoding the data contained in incoming frames. The decoder 223 requires a synchronization indication provided by the signal acquisition module 222 to synchronize on the data frame's starting point. The data decoder 223 may be part of a media access control (MAC) layer module of the receive 220. Typically, the signal acquisition module 222 is implemented in the physical (PHY) layer module (not shown) and the RF circuitry 221 is implemented in the RF front-end of the receiver 220.

Some non-limiting examples of electronic devices suitable for coupling to a receiver 220 are a computer by way of a PCI express bus or other connectivity bus standard such as a universal serial bus (USB), a serial advanced technology attachment (SATA) bus, and the like; similarly, an electronic device can be a laptop computer, a tablet computer, a personal digital assistant, a smartphone, a wearable computing device, a remote alarm terminal, a kiosk, a wireless modem, or a receiver 200, which can be implemented as part of a transceiver array in a user equipment (e.g., smart phone, tablet or laptop computer) to support wireless communication over the 60 GHZ frequency band. The receiver 220 can be coupled to any consumer electronic device seeking to support applications which operate in the 60 GHz frequency band, for example in compliance with the IEEE 802.11 ad standard.

Figure 3:
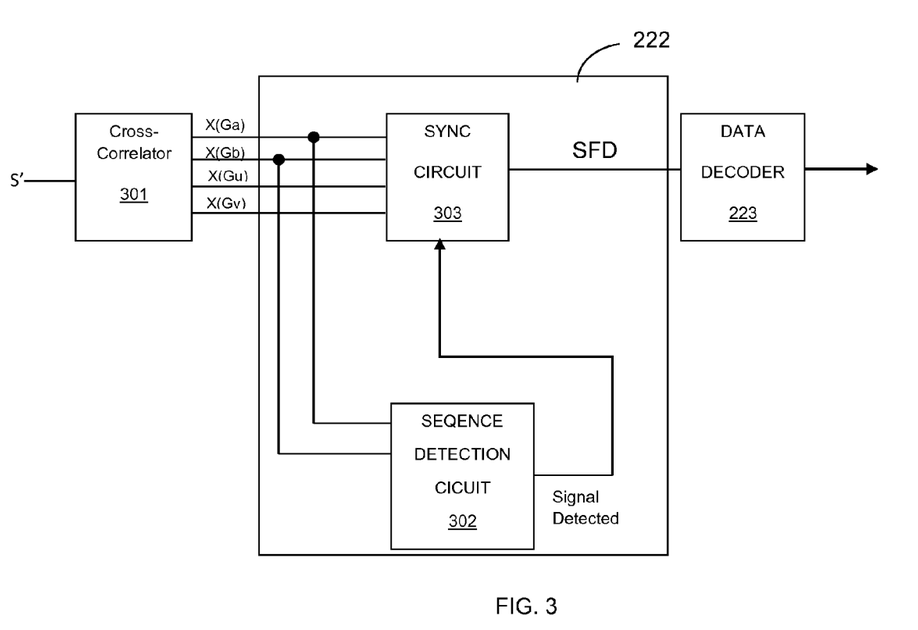
FIG. 3 is a block diagram of a millimeter-wave receiver implemented according to one embodiment.

FIG. 3 is an exemplary and non-limiting block diagram of the signal acquisition circuit 222 implemented according to one embodiment. The circuit 222 includes a cross-correlator 301 coupled to a signal sequence detection module 302 and a timing synchronization circuit 303. The output of timing synchronization circuit 303 is coupled to the data decoder 223. The cross-correlator 301 is configured to receive a signal S' that includes Golay complementary sequences (Gu',Gv'). It should be noted that due to the channel conditions, the received complementary sequences may be different from the original complementary sequences Gu, Gv included in signals output by the transmitter 210. In certain embodiments, the signal S' (including sequences Gu',Gv') is filtered using, e.g., a polyphase filter, to change the sampling rate of those signals to a rate employed by the cross-correlator 301.

In one non-limiting exemplary embodiment, the cross-correlator 301 is configured to cross-correlate the received complementary sequences (Gu', G'v') with preset complementary sequences. The complementary sequences (Gu', Gv') comprise a concatenation of two different complementary Golay sequences, each of which includes sequence values (elements) determined by a delay vector (D) and a weight vector (W). The vectors D and W each have K values. The number of elements (samples) of the Golay sequence is 2K. An exemplary and non-limiting implementation of the cross-correlator 301 can be found in a U.S. patent application Ser. No. 13/408,625 to Sanderovich et al., which is assigned to common assignee, and is incorporated hereby by reference for all that it contains.

In an embodiment, the cross-correlator 301 provides cross-correlation results (X(Ga), X(Gb), X(Gu), and X(Gv) of the 4 different sequences Ga', Gb', Gu', and Gv', where the detection module 302 receives only the sequences provided by the cross correlation of Ga' and Gb'. The detection module 302 identifies detection sequences in the received signal S' being indicative of a signal detection.

Figure 4:
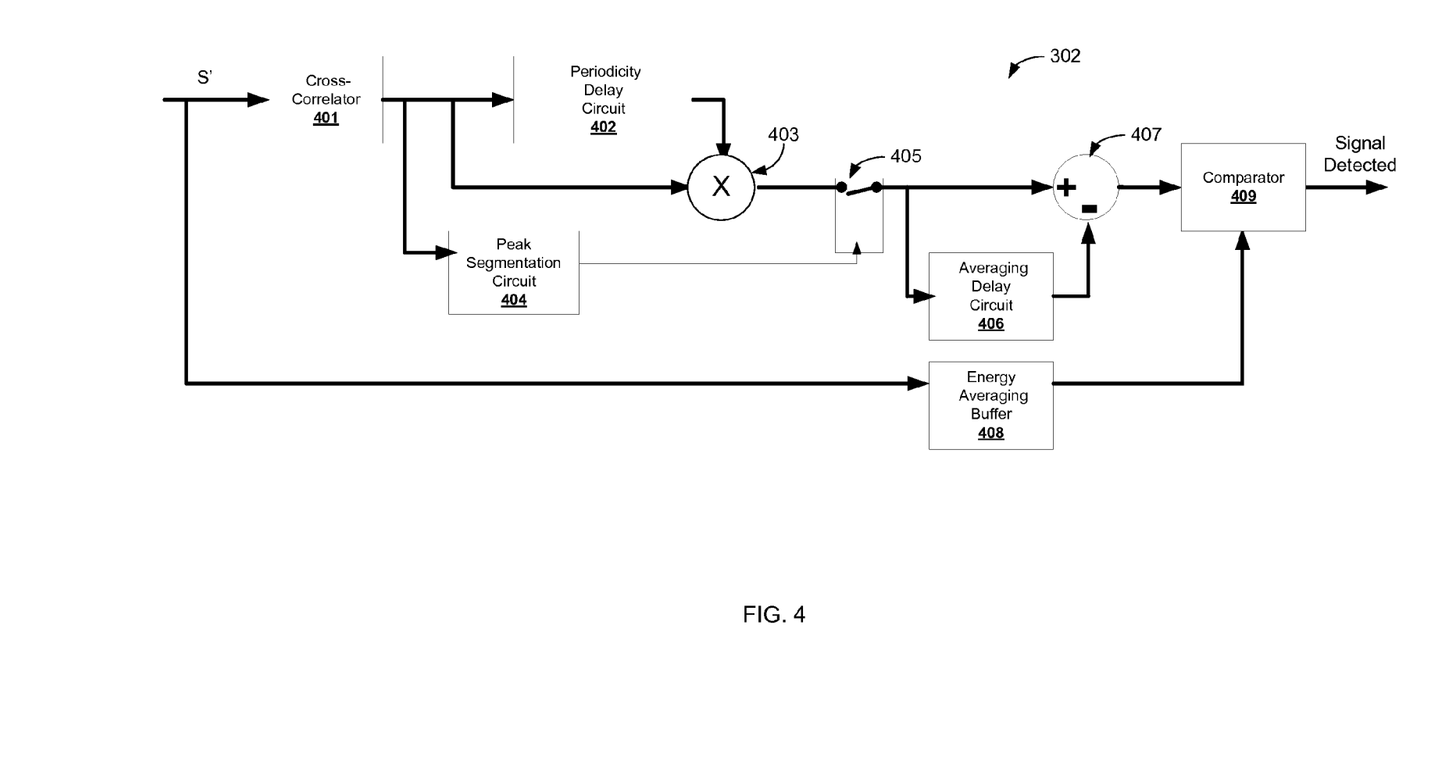
FIG. 4 is a block diagram of a detection module implemented according to one embodiment.

According to the disclosed embodiments, discussed in detail with respect to FIG. 4, the sequences are detected by auto-correlating the cross-correlated sequences X(Ga) and X(Gb) provided by the cross-correlator 301. Specifically, the auto-correlation is performed on the cross-correlated sequences (or samples) with their respective delayed sequences (samples). Performing the cross-correlation prior to the auto-correlation allows easy detection of different patterns, such as DC, spectral bandwidth limit, and the like relevant for periodicity extraction by auto-correlation. That is, the auto-correlation operation over the cross-correlation (X) results provided by the cross-correlator can defined as follows:

$$\Sigma_{i=0}^{AvWin} X(t-1)*X(t-1-128) > TH*\Sigma_{i=0}^{AvWin} |S'(t-i)|^2 \quad \text{Equation No. 1}$$

where X is defined as:

$$X(t) = \Sigma_{k=0}^{128} S'^{*} G_{a128}(k) \quad \text{Equation No. 2}$$

The parameter 'AvWin' is a programmable average window for achieving a required sensitivity for level detection and low SNR performance, and the value TH is a threshold value which is a ratio between a number of "missed detections" and a number of false detections.

In an embodiment, the threshold TH is programmable based on the indoor/outdoor conditions in which the receiver operates and/or the application of the receiver. For example, to achieve sensitive detection a lower value of TH is utilized, which may result in signal detection at a very low SNR with a potential for increased detections. On the other hand, to achieve a trustworthy detection, a higher threshold TH value is utilized that may result with less probability of detection in the existence of a low SNR.

In an embodiment, the AvWin is a moving average. Typically, a moving-average function measures the correlation between values of a signal at different times, as a function of a time leg applied on a filter. Thus, the moving-average is the average result of the received signal along a shifted window. Performing the auto-correlation using a moving-average (i.e., on a set of values i=0 to AvWin) allows filtering out a white-noise during that window. The duration of the window of AvWin determines the sensitivity to noise of the sequence detection. That is, a shorter AvWin is less sensitive to SNR than a longer AvWin. As noted above, the AvWin is a programmable parameter.

In another embodiment, the auto-correlation averaging is performed on peak samples output by the correlator 301 (i.e., Golay-CrossCorrelation(X) of a signal S'). In this embodiment, the values X in Equation No. 1 are peak values and a predefined number of adjacent samples. Therefore, the detection module includes flow results with an improved detection performance in low SNR within challenging multi-path channels.

In the receiver 220 operable according to the IEEE 802.11ad standard, the sequence detection, and hence the sequence detection module 302 is active during a STF (e.g., STF 120 in FIG. 1). As noted above, an IEEE 802.11ad preamble including STF 120 is composed of 16 repetitions of the sequence Ga128(n) in length 128 followed by a single repetition of −Ga128(n). Once the sequences are detected by the module 302, a signal detection indication is fed into the timing synchronization module 303 triggering a frame start synchronization process.

The timing synchronization module 303 detects a timing-synchronization signal as being an indicative of a start of the data frames transmitted by the transmitter 210. The detection is performed using a two-stage process utilizing preamble sequences included in the STF and CEF in the IEEE 802.11ad preamble, such as the preamble shown in FIG. 1. According to the disclosed embodiments, the detection of the timing synchronization signal, i.e., the SFD is performed without any constant threshold or a threshold that is relative to energy levels, thereby enabling detection of the timing synchronization signal in low SNR range in the presence of multipath channels.

Figure 5:
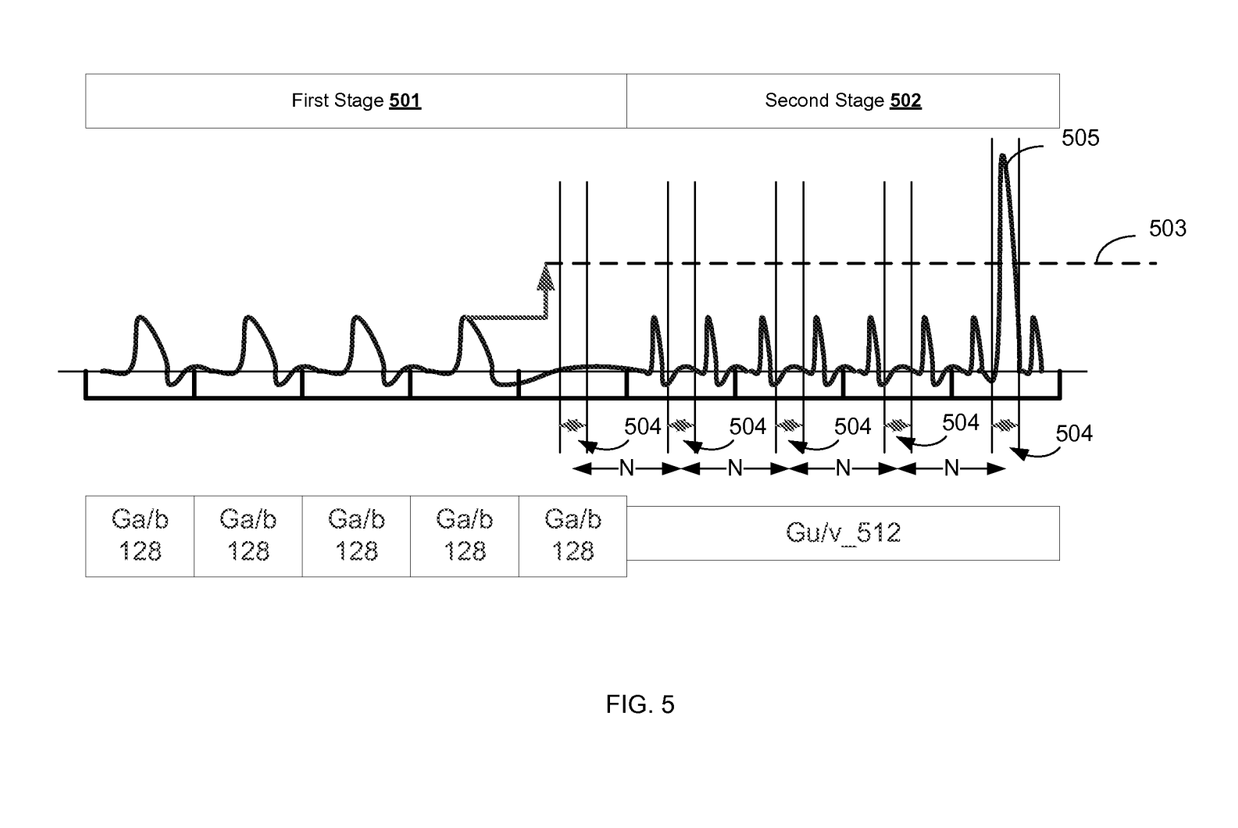
FIG. 5 is a sequence flow illustrating the operation of a timing synchronization module according to one embodiment.

The operation of the timing synchronization module 303 is further described with reference to FIG. 5. In an embodiment, the timing synchronization module 303 receives the cross-correlation results of the sequences Ga', Gb', Gu' and Gv', where during a first stage 501 only the sequences Ga' and Gb' are analyzed, and Gu' and Gv' are processed during the second stage 502 of the operation of the module 303. The sequences Ga', Gb', Gu' and Gv' are part of the 802.11ad preamble. As noted above, such preambles contain several repetitions of Golay-128 patterns (Ga', Gb'), followed by a start frame delimiter-channel-estimation Golay-512-patterns (Gu', Gv').

At the first stage 501, the synchronization is determined within repetitive Golay-128 samples. Specifically, 128 samples provided by the cross-correlator 301 are sorted to find a peak sample. An index of the peak sample indicates a best timing within the Golay 128 samples. It should be noted that the peak search is relative to other samples which is invariant to a channel's characteristics. In addition, a SFD search threshold 503 is set relative to an absolute value of the detected peak. For example, the absolute value of the peak is multiplied by a predefined factor to achieve the threshold 503. This threshold is utilized during the second stage 502, thereby allowing adoption of further timing-synchronization to the actual channel's characteristics.

At the second stage 502, synchronization is determined within repetitive Golay-512 samples provided by the cross-correlator 301. In an embodiment, these Golay-512 samples are within the CEF 130 of the IEEE 802.11 ad preamble. According to one embodiment, the search for synchronization signal is performed within an SFD search window 504. Specifically, the SFD search window is open every N samples to search for the timing synchronization signal, i.e., the start frame delimiter (SFD). In an exemplary embodiment, N equals 128 samples and the SFD-Search-Window is set +/−3 samples of 1.76 GHz.

A peak in the correlation results of the Golay-512 samples that exceeds SFD search threshold 503 is determined as the timing synchronization signal, i.e., the start frame delimiter (SFD). In the exemplary FIG. 5, the peak 505 is the detected SFD. Upon detection of the SFD, a synchronization indication is fed to the data decoder 304 (FIG. 3).

In an embodiment, the sorting and searching for peaks during the stages 501 and 502 are performed during a programmable short (or fast) moving average over the cross-correlation results fed by the correlator 301. It should be appreciated that the combined two stages for detecting SFD results with an improved signal timing synchronization performance.

FIG. 4 illustrates an exemplary and non-limiting block diagram of the detection module 302 implemented according to one embodiment. The sequence detection module 302 is connected to the cross-correlator 401 which cross-correlates samples of the complementary sequences. In an embodiment, these samples are a product of the Golay-128 sequences (Ga' and Gb') included in the STF (e.g., STF 120) of an IEEE 802.11ad preamble sequence. Thus, the detection module 302 is operable during the STF. The operation of the cross-correlator 401 is discussed in more detail above.

The output of the cross-correlator 401 is fed into an auto-correlator mechanism comprised of a periodic delay circuit 402 and a multiplier 403. In an embodiment, the auto-correlator mechanism also includes a peak segmentation circuit 404 and a switch 405. The periodic delay circuit comprises a FIFO buffer having a length determined by the periodic delay. The delay may be equal to 128 samples. The auto-correlator mechanism measures the correlation between values of a signal at different times as a function of a time leg provided by the delay circuit 402. That is, the delay circuit 402 generates a periodic time-leg signal and a multiplier 403 multiplies the cross-correlated signals (provided by the correlator 301) by the time-leg signal to perform the auto-correlating function. The auto-correlation improves the immunity to multipath channels.

As noted above, the sequence detection is performed using a moving average applied on the auto-correlation results (output by the multiplier 403). The moving average is realized by an averaging delay circuit 406 and an adder 407 that together provide to a comparator 409 the sum of samples measured or otherwise computed during the averaging window (AvWin) as defined above in Equation No. 1. In an embodiment, the auto-correlation averaging can be limited to peak samples of the cross-correlator's 301 output. The peak and their surrounding samples (i.e., peak segments) are identified by the peak segmentation circuit 404 which enables the switch 405.

The comparator 409 receives two measures: the auto-correlation results from the adder 407 and the energy level of the input signal averaged over the averaging window. The latter measure ($C_2$) is provided by an energy averaging buffer 408 connected to a received signal S' and the comparator. The comparator 409 determines whether the sum of the auto-correlation results ($C_1$) is greater than the measure $C_2$ multiplied by a detection threshold (TH). That is, the comparator 409 is configured to perform the comparison operation defined in Equation No. 1. If the comparison operation passes, the comparator 409 generates a signal detection indication.

Figure 6:
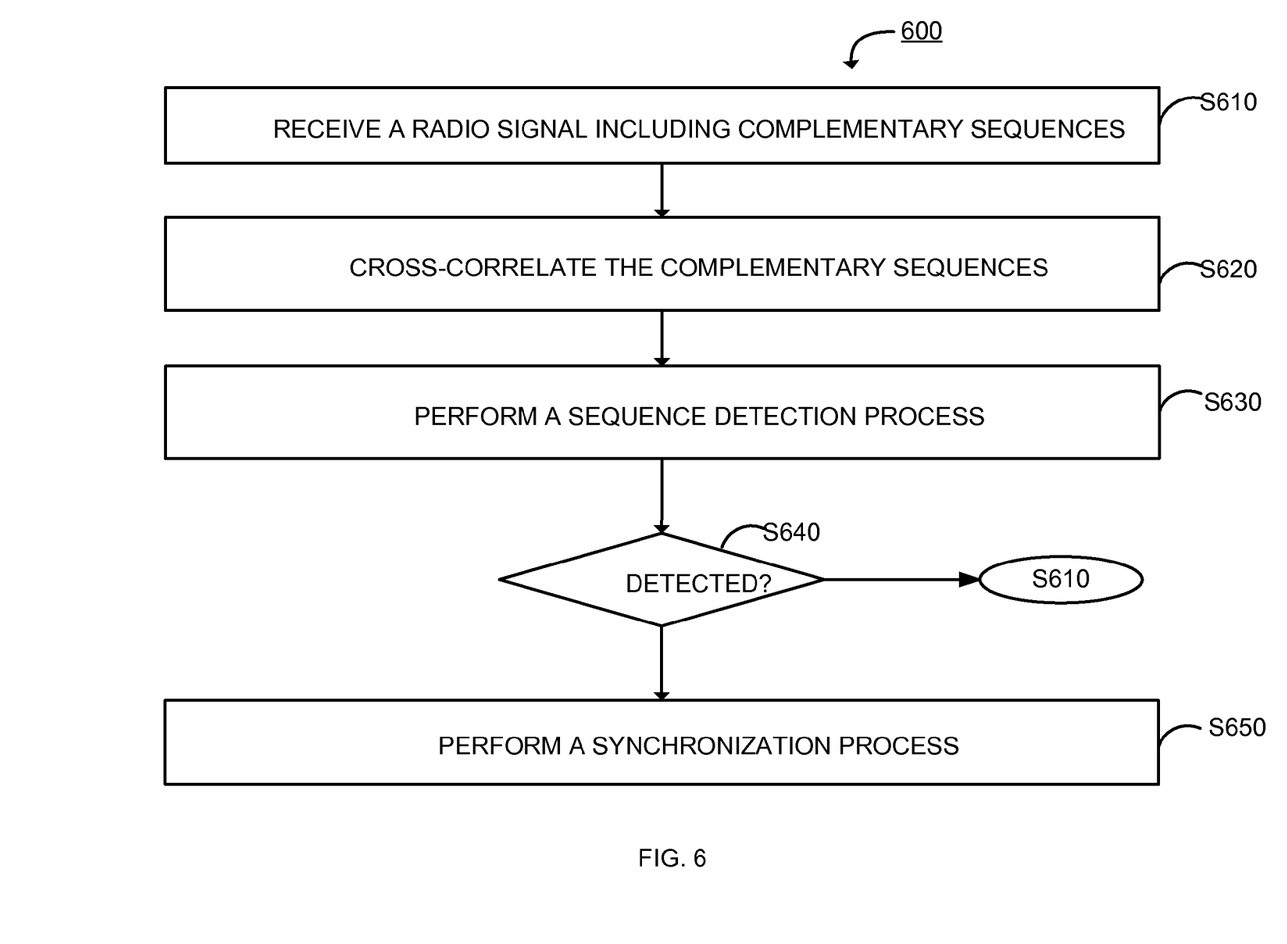
FIG. 6 is a flowchart illustrating a method for initial signal acquisition in a millimeter-wave wireless communication system according to one embodiment.

FIG. 6 shows an exemplary and non-limiting flowchart 600 illustrating a method for initial signal acquisition in a millimeter wave wireless communication system according to one embodiment. At S610, a radio signal including complementary sequences is received at a receiver for each frame of a PLOP protocol data unit (PPDU). The radio signal is a millimeter-wave signal. At S620, the received signal is cross-correlated with predefined complementary sequences. In an embodiment, S620 can be performed on Golay-128 sequences, Golay-512 sequences, or both. The Golay-128 and Golay-512 sequences are respectively included in a STF and a CEF of the PPDU preamble. In an embodiment, the preamble is defined in the IEEE 802.11ad standard.

At S630, an attempt to detect reception of a signal is performed. In an embodiment, S630 includes auto-correlating the cross-correlation samples over an averaging window. The size of the window determines the sensitivity of the detection. In one embodiment, the averaging window is applied only on peak segments of the cross-correlation samples. In an embodiment, only cross-correlation samples of the Golay-128 sequences are utilized in S630.

At S640, it is checked if a signal detection indication is asserted, and if so execution continues with S650; otherwise, execution returns to S610. In an embodiment, a signal detection indication is asserted if Equation No. 1 is satisfied. It should be noted that a signal received at S610 may be noise or a distorted signal which cannot be properly processed by the receiver. In such cases, the detection indication would not be asserted.

At S650, a synchronization process for detecting the start frame delimiter (SFD) is performed. In an embodiment, S650 includes searching the cross-correlation samples product of the Golay-128 sequences for a peak sample, setting a SFD search threshold (e.g., threshold 503) relative to an absolute value of the peak sample, and searching the cross-correlation samples product of the Golay-512 sequences for a peak that exceeds the SFD search threshold which is the SFD. In an embodiment, such a search is performed for a duration of an SFD search window (e.g., window 504). The SFD search window is opened every N samples. In exemplary embodiment, N equals 128 samples and the SFD-Search-Window is set +/−3 samples of 1.76 GHz.

The various embodiments disclosed herein can be implemented in wireless systems employing millimeter-wave transmission in the 60 GHz band, such as defined by the IEEE 802.11ad standard. However, the disclosed embodiments can also be utilized in wireless systems employing other types of wireless protocols or standards.

The various embodiments of the invention can be implemented as hardware, firmware, software or any combination thereof. Moreover, the software is preferably implemented as an application program tangibly embodied on a program storage unit, computer readable medium, or machine readable medium. One of ordinary skill in the art would recognize that a "machine readable medium" is a medium capable of storing data and can be in a form of a digital circuit, an analogy circuit or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Also as used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a computer, laptop computer, a tablet or mobile phone or server, to perform various functions and (c) to circuits, such as a microprocessor(s) or a portion of a microprocessor(s), that require software or firmware for operation, even if the software or firmware is not physically presence. This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware.

What is claimed is:

1. A method for performing signal acquisition by an apparatus in a wireless communication system, comprising:
   receiving a wireless signal comprising complementary sequences;
   cross-correlating the received complementary sequences with respective complementary sequences, wherein the received complementary sequences comprise a first type of complementary sequences and a second type of complementary sequences;
   performing a signal sequence detection by auto-correlating the cross-correlated first type of complementary sequences and comparing the auto-correlated results of the auto-correlating to an energy dependent threshold; and
   upon detection of the signal sequence, performing a timing synchronization to synchronize a start frame delimiter (SFD) of the received signal, wherein performing the timing synchronization comprises:
      searching for a peak in the cross-correlated first type of complementary sequences;
      upon identifying a peak sample in the cross-correlated first type of complementary sequences, setting a SFD search threshold relative to an absolute value of the peak sample; and
      searching the cross-correlated second type of complementary sequences for a peak exceeding the SFD search threshold, wherein the searching the cross-correlated second type of complementary sequences for the peak exceeding the SFD search threshold is performed for a duration of a search window at different intervals.

2. The method of claim 1, wherein the received complementary sequences are Golay complementary sequences, wherein the first type is Golay-128 sequences and the second type is Golay-512 sequences.

3. The method of claim 1, wherein the received complementary sequences are within a preamble of the received signal, and wherein the preamble is defined in an IEEE 802.11ad standard.

4. The method of claim 1, wherein performing the signal sequence detection further comprises:
   applying an averaging window on the auto-correlating results, wherein a size of the averaging window determines a sensitivity of the signal sequence detection.

5. The method of claim 4, wherein the averaging window is applied only on peak segments of the cross-correlated first type of complementary sequences.

6. The method of claim 1, wherein the energy dependent threshold is a function of energy of the received wireless signal and a signal detection sensitivity associated with the apparatus.

7. The method of claim 1, wherein detection of the signal sequence occurs when a sum of the auto-correlating results exceeds the energy dependent threshold.

8. A wireless device, comprising:
   at least one antenna; and
   a receiver configured to:
      receive, via the at least one antenna, a wireless signal, wherein the wireless signal comprises a plurality of complementary sequences;
      cross-correlate the received complementary sequences with respective complementary sequences, wherein the received complementary sequences comprise a first type of complementary sequences and a second type of complementary sequences;
      perform a signal sequence detection by auto-correlating the cross-correlated first type of complementary sequences and comparing results of the auto-correlating to an energy dependent threshold; and
      upon detecting the signal sequence, perform a timing synchronization to synchronize a start frame delimiter (SFD) of the received signal, wherein performing the timing synchronization comprises:
- searching for a peak in the cross-correlated first type of complementary sequences;
- upon identifying a peak sample in the cross-correlated first type of complementary sequences, setting a SFD search threshold relative to an absolute value of the peak sample; and
- searching the cross-correlated second type of complementary sequences for a peak exceeding the SFD search threshold, wherein the searching the cross-correlated second type of complementary sequences for the peak exceeding the SFD search threshold is performed for a duration of a search window at different intervals.

9. An apparatus for performing signal acquisition in a wireless communication system, comprising:
- a radio frequency (RF) circuit configured to receive a wireless signal comprising complementary sequences;
- a cross-correlator circuit configured to cross-correlate the received complementary sequences with respective complementary sequences, wherein the received complementary sequences comprise a first type of complementary sequences and a second type of complementary sequences;
- a signal sequence detection circuit configured to detect a signal sequence in the received signal, wherein the signal sequence detection circuit is configured to auto-correlate the cross-correlated first type of complementary sequences and compare results of the auto-correlating to an energy dependent threshold; and
- a timing synchronization circuit configured to perform a timing synchronization to synchronize a start frame delimiter (SFD) of the received signal, wherein performing the timing synchronization comprises:
  - searching for a peak in the cross-correlated first type of complementary sequences;
  - upon identifying a peak sample in the cross-correlated first type of complementary sequences, setting a SFD search threshold relative to an absolute value of the peak sample; and
  - searching the cross-correlated second type of complementary sequences for a peak exceeding the SFD search threshold, wherein the searching the cross-correlated second type of complementary sequences for the peak exceeding the SFD search threshold is performed for a duration of a search window at different intervals.

10. The apparatus of claim 9, wherein the received complementary sequences are Golay complementary sequences, wherein the first type is Golay-128 sequences and the second type is Golay-512 sequences.

11. The apparatus of claim 9, wherein the received complementary sequences are within a preamble of the received signal, and wherein the preamble is defined in an IEEE 802.11ad standard.

12. The apparatus of claim 9, wherein the signal sequence detection circuit is further configured to:
- apply an averaging window on the auto-correlating results, wherein a size of the averaging window determines a sensitivity of the signal sequence detection.

13. The apparatus of claim 12, wherein the averaging window is applied only on peak segments of the cross-correlated first type of complementary sequences.

14. The apparatus of claim 9, wherein the energy dependent threshold is a function of energy of the received wireless signal and a signal detection sensitivity associated with the apparatus.

15. The apparatus of claim 9, wherein detection of the signal sequence occurs when a sum of the auto-correlating results exceeds the energy dependent threshold.

16. The apparatus of claim 9, wherein the timing synchronization circuit is activated upon detection of the signal sequence.

* * * * *